United States Patent
Shen

(10) Patent No.: US 11,799,545 B2
(45) Date of Patent: Oct. 24, 2023

(54) FREE SPACE OPTICAL COMMUNICATIONS METHOD, AND TRANSMITTER AND RECEIVER

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 112 days.

(21) Appl. No.: 17/467,105

(22) Filed: Sep. 3, 2021

(65) Prior Publication Data

US 2021/0399800 A1 Dec. 23, 2021

Related U.S. Application Data

(63) Continuation of application No. PCT/CN2019/077545, filed on Mar. 8, 2019.

(51) Int. Cl.
*H04B 10/077* (2013.01)
*H04B 10/116* (2013.01)

(52) U.S. Cl.
CPC ....... *H04B 10/0775* (2013.01); *H04B 10/116* (2013.01)

(58) Field of Classification Search
CPC .................... H04B 10/0775; H04B 10/116
USPC .......................................................... 398/33
See application file for complete search history.

(56) References Cited

U.S. PATENT DOCUMENTS

| 5,229,593 | A | * | 7/1993 | Cato | G02B 3/00 250/551 |
| 5,808,760 | A | * | 9/1998 | Gfeller | H04B 10/1143 398/119 |
| 6,643,466 | B1 | * | 11/2003 | Helms | H04B 10/503 398/115 |
| 11,082,128 | B1 | * | 8/2021 | Dickson | H04B 10/1143 |

(Continued)

FOREIGN PATENT DOCUMENTS

| CN | 103825656 A | 5/2014 |
| CN | 107436430 A | 12/2017 |

(Continued)

OTHER PUBLICATIONS

Extended European Search Report for EP Application 19919179.2 dated Feb. 1, 2022. (8 pages).

(Continued)

*Primary Examiner* — Dalzid E Singh
(74) *Attorney, Agent, or Firm* — Young Basile Hanlon & MacFarlane, P.C.

(57) ABSTRACT

Described are a free space optical communications method, and a transmitter and a receiver. The method comprises: transmitting, by means of an optical signal, wireless data between a transmitter and a receiver; transmitting, between the transmitter and the receiver, a wireless detection signal different from the optical signal; detecting whether the wireless detection signal is blocked; and adjusting, according to a detection result, the transmission of the optical signal to reduce the intensity of the optical signal or suspend the transmission of the optical signal when the wireless detection signal is blocked.

16 Claims, 16 Drawing Sheets

(56) References Cited

U.S. PATENT DOCUMENTS

| | | | |
|---|---|---|---|
| 2002/0089727 A1* | 7/2002 | Alwan | H04B 10/40 398/192 |
| 2011/0150472 A1 | 6/2011 | Davidson et al. | |
| 2022/0045761 A1* | 2/2022 | Csajaghy | H04B 10/40 |

FOREIGN PATENT DOCUMENTS

| | | |
|---|---|---|
| JP | H06021893 A | 1/1994 |
| JP | 2005277810 A | 10/2005 |

OTHER PUBLICATIONS

International Search Report with English Translation for International Application PCT/CN2019/077545 dated Nov. 19, 2019. (4 pages).

\* cited by examiner

FREE SPACE OPTICAL COMMUNICATIONS METHOD, AND TRANSMITTER AND RECEIVER

CROSS-REFERENCE TO RELATED APPLICATION(S)

The present application is a continuation application of International Application No. PCT/CN2019/077545, filed on Mar. 8, 2019, the entire content of which is hereby incorporated by reference.

TECHNICAL FIELD

The present disclosure relates to, but is not limited to, the field of communication, and more specifically, to a Free Space Optical Communications (FSO) method, a system, a transmitter, and a receiver.

BACKGROUND

FSO refers to a communication technology that takes a light wave as a carrier to deliver information in vacuum or atmosphere. It may be divided into atmospheric optical communication, inter-satellite optical communication, and satellite-ground optical communication, and may also be called optical wireless communication. Different from optical fiber communication, FSO may be used in a wireless communication system without a wired connection. Existing wireless communication frequency bands (including a microwave frequency band, and a millimeter wave frequency band) have been used by 4G, and 5G, and it is very difficult to find more spectrum resources again to realize a higher transmission rate. However, FSO may use a spectrum resource, realizing a data rate above Gbps, and have an advantage such as good directivity, a small interference, good security, full duplex. It is considered as an important candidate technology for B5G/6G, and may be used in various scenarios such as vehicle networking, Internet of Things, robot communication, wireless backhaul.

In a traditional FSO system, as shown in FIG. 1, wireless data are transmitted through an optical signal sent by an FSO transmitter to an FSO receiver. In order to obtain a relatively high data rate for transmission, a relatively narrow directional beam is usually used for FSO communication.

In an FSO system, a coverage distance and a data rate which are realizable are related to an intensity of an optical signal. The greater the intensity of the optical signal is, the farther the coverage distance is, and the higher the data rate is. The smaller the intensity of the optical signal is, the closer the coverage distance is, and the lower the data rate is. However, a relatively strong optical signal may cause harm to a human body (especially human eyes), and a transmission power of an optical signal must be limited according to an application scenario.

For a special scenario such as air-ground relay, water surface communication, fixed relay, since it may be ensured that there is no person on an optical path, transmission may be performed with a relatively high power, thus realizing relatively large coverage and relatively high data rate. However, for terrestrial wireless communication, since optical paths often pass through areas where people appear, in order to protect human eyes, transmission is only performed with a relatively low power, which cannot realize long-distance coverage and high data rate transmission.

SUMMARY

The following is a summary of a subject matter described in detail herein. This summary is not intended to limit the protection scope of the claims.

In order to solve an existing technical problem, implementations of the present disclosure provide a free space optical communications method, a transmitter, and a receiver.

In a first aspect, an implementation of the present disclosure provides a free space optical communications method, including: transmitting wireless data between a transmitter and a receiver through an optical signal; emitting wireless detection signals different from the optical signal between a transmitter and a receiver; detecting whether the wireless detection signals are blocked; and adjusting transmission of the optical signal according to a detection result, so as to reduce an intensity of the optical signal or suspend the transmission of the optical signal when the wireless detection signals are blocked.

In a second aspect, an implementation of the present disclosure provides a free space optical communications method, including: transmitting, by a transmitter, wireless data to a receiver through an optical signal, wherein there exist wireless detection signals different from the optical signal exists between the transmitter and the receiver; determining, by the transmitter, whether the wireless detection signals are blocked; and reducing an intensity of the optical signal or suspending transmission of the optical signal when the wireless detection signals are blocked.

In a third aspect, an implementation of the present disclosure provides a free space optical communications method, including: receiving, by a receiver, wireless data transmitted by a transmitter to the receiver through an optical signal; receiving, by the receiver, wireless detection signals different from the optical signal and emitted by the transmitter; and feeding back information of whether the wireless detection signals are blocked to the transmitter.

In a fourth aspect, an implementation of the present disclosure provides a free space optical communications method, including: receiving, by a receiver, wireless data transmitted by a transmitter to the receiver through an optical signal; and emitting, by the receiver, wireless detection signals different from the optical signal, wherein the wireless detection signals are distributed around the optical signal.

In a fifth aspect, an implementation of the present disclosure provides a transmitter for free space optical communications, including: an optical signal transmitting module, configured to transmit wireless data to a receiver through an optical signal, wherein there exist wireless detection signals different from the optical signal between the transmitter and the receiver; a determining module, configured to determine whether the wireless detection signals are blocked; and an adjusting module, configured to reduce an intensity of the optical signal or suspend transmission of the optical signal when the wireless detection signals are blocked.

In a sixth aspect, an implementation of the present disclosure provides a receiver for free space optical communications, including: an optical signal receiving module, configured to receive wireless data transmitted by a transmitter to the receiver through an optical signal; a detection signal receiving module, configured to receive wireless detection signals different from the optical signal and emitted by the transmitter; and a feedback module, configured to feed back information of whether the wireless detection signals are blocked to the transmitter.

In a seventh aspect, an implementation of the present disclosure provides a receiver for free space optical communications, including: an optical signal receiving module, configured to receive wireless data transmitted by a transmitter to the receiver through an optical signal; and a detection signal emitting module, configured to emit wireless detection signals different from the optical signal, wherein the wireless detection signals are distributed around the optical signal.

In an eighth aspect, an implementation of the present disclosure further provides a transmitter, wherein the transmitter includes a processor, a memory, a communication interface, and one or more programs, the one or more programs are stored in the memory and configured to be executed by the processor, and the program includes instructions for executing acts in any method of the second aspect in an implementation of the present disclosure.

In a ninth aspect, an implementation of the present disclosure further provides a receiver, wherein the receiver includes a processor, a memory, a communication interface, and one or more programs, the one or more programs are stored in the memory and configured to be executed by the processor, and the program includes instructions for executing acts in any method of the third aspect or the fourth aspect in an implementation of the present disclosure.

Other aspects will become apparent upon reading and understanding the drawings and detailed description.

DETAILED DESCRIPTION

The present disclosure describes multiple implementations, but the description is illustrative, not restrictive, and it is obvious to those of ordinary skill in the art that there may be more implementations and implementation modes within the scope contained in implementations described in the present disclosure. Although many possible combinations of features are shown in drawings and discussed in detailed implementations, many other combinations of disclosed features are also possible. Unless specifically limited, any feature or element of any implementation may be used in combination with or instead of any other feature or element of any other implementation.

Combinations of features and elements known to those of ordinary skill in the art are included and contemplated in the present disclosure. Implementations, features and elements disclosed in the present disclosure may also be combined with any conventional feature or element to form a unique inventive solution defined by the claims. Any features or elements of any implementation may also be combined with a feature or an element from another technical solution to form another unique technical solution defined by the claims. Therefore, it should be understood that any feature shown and/or discussed in the present disclosure may be implemented alone or in any suitable combination. Therefore, the implementations are not limited except those made according to the appended claims and their equivalents. In addition, various modifications and changes may be made within the protection scope of the appended claims.

In addition, when describing a representative implementation, the specification may have presented a method and/or a process as a specific act sequence. However, to the extent that the method or the process does not depend on a specific order of acts described herein, the method or the process should not be limited to the described acts in the specific order. As will be understood by those of ordinary skill in the art, another sequence of acts is also possible. Therefore, a specific sequence of acts set forth in the specification should not be interpreted as limiting the claims. In addition, the claims directed to the method and/or the process should not be limited to the disclosed order for performing the acts, and those skilled in the art may easily understand that these orders may be changed and still be in the spirit and the scope of the implementations of the present disclosure.

Figure 1:
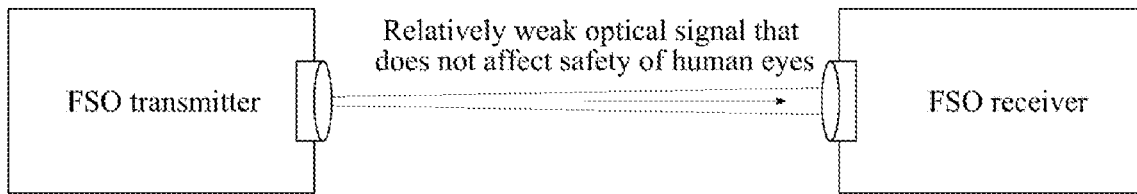
FIG. 1 is a schematic diagram of an FSO transmitter and an FSO receiver communicating through a relatively weak optical signal that does not affect human safety.
Figure 2:
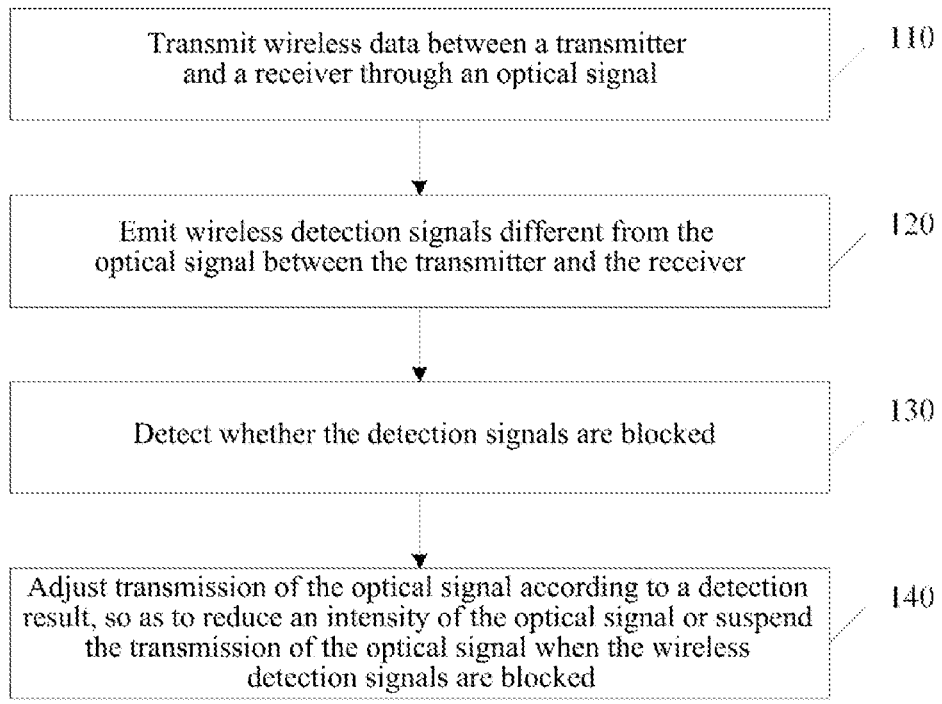
FIG. 2 is a flowchart of an FSO optical communication method according to an illustrative implementation of the present disclosure.

An illustrative implementation of the present disclosure provides a free space optical communications method, in which wireless data are transmitted between a transmitter and a receiver through an optical signal, and transmission of the optical signal is adjusted by performing detection surrounding an optical signal between the transmitter and the receiver. As shown in FIG. 2, acts 110 to 140 are included.

In act 110, wireless data are transmitted between a transmitter and a receiver through an optical signal.

In act 120, wireless detection signals different from the optical signal are emitted between the transmitter and the receiver.

In act 130, whether the wireless detection signals are blocked is detected.

In act 140, transmission of the optical signal is adjusted according to a detection result, so as to reduce an intensity of the optical signal or suspend the transmission of the optical signal when the wireless detection signals are blocked.

In an illustrative implementation of the present disclosure, wireless detection signals different from the optical signal are emitted, including: wireless detection signals safe for human eyes are emitted, wherein the wireless detection signals are distributed around the optical signal.

In an illustrative implementation of the present disclosure, whether the wireless detection signals are blocked is detected, including: the wireless detection signals or the echoes are received, and whether the wireless detection signals are blocked is determined according to a receiving result.

The above wireless detection signals are emitted immediately after optical communication between the transmitter and the receiver is started. During communication between the transmitter and the receiver, whether there is a blockage around an optical signal may be detected in real time through emitting the above wireless detection signals. Once it is found that there is a blockage, transmission of an optical signal may be restricted and suspended or a relatively weak optical signal may be transmitted instead.

In a first example, the transmitter emits wireless detection signals and receives echoes of the wireless detection signals, and determines whether there is a blockage around the optical signal according to a situation of reception, that is, whether the wireless detection signals are blocked. If the wireless detection signals are blocked, it is indicated that there is a blockage around the optical signal, and if all of the wireless detection signals are not blocked, it is indicated that there is no blockage around the optical signal.

This example is realized by radar detection, including: the transmitter or the receiver finds a target through radar detection and measures a distance of the target, and the radar emits wireless detection signals; determines whether a distance of the target measured through the wireless detection signals is consistent with a distance of the receiver, if so, determines that the wireless detection signals are not blocked, and if not, determines that the wireless detection signals are blocked.

If there is no blockage around the optical signal, the distance of the target measured through the wireless detection signals (referring to a distance between the radar and the target) should be consistent with the distance of the receiver (referring to a distance between the radar and the receiver), that is, within an allowable error range, the two distances should be equal. If there is a blockage around the optical signal, a distance of the target measured by at least one wireless detection signal is inconsistent with the distance of the receiver. Therefore, it may be determined whether there is a blockage around the optical signal.

In this example, if radar detection is performed by the receiver, it is necessary to feed back information of whether there is a blockage around the optical signal to a transmitter. Of course, it is also possible for the receiver may feed back data detected by the radar to the transmitter, and the transmitter determines whether there is a blockage around the optical signal.

The radar of an implementation of the present disclosure may use a millimeter wave, a laser, or the like as a radar signal, but it is not limited thereto, and another type of electromagnetic wave may also be used. It may be selected and used according to an actual application environment, a detect distance, an accuracy requirement, or the like, specifically.

In a second example, the transmitter emits wireless detection signals, and determines whether the wireless detection signals are blocked according to a situation of that the receiver receives the wireless detection signals, and the receiver feeds back related information to the transmitter. Detecting whether the wireless detection signals are blocked includes, for example: the transmitter emits wireless detection signals, and the receiver receives the wireless detection signals and feeds back information to the transmitter, if the wireless detection signals are all received, first indication information indicating that the wireless detection signals are not blocked is fed back; and if at least one wireless detection signal is not received, second indication information indicating that the wireless detection signals are blocked is fed back; and the transmitter determines whether the wireless detection signals are blocked according to a type of the received indication information.

In this example, if the receiver feeds back indication information of whether there is a blockage around the optical signal, the receiver determines whether there is a blockage around the optical signal according to a receiving result. If the receiver feeds back a receiving result of the wireless detection signals, the transmitter determines whether there is a blockage around the optical signal according to the receiving result.

In a third example, the detection is realized by a mode in which the transmitter emits wireless detection signals, and the receiver determines whether to feed back indication information to the transmitter according to a receiving situation. Detecting whether the wireless detection signals are blocked includes: the transmitter emits wireless detection signals; if receiving all of the wireless detection signals, the receiver continuously feeds back information to the transmitter, and if at least one wireless detection signal is not received, the receiver suspends feeding back information; when receiving the information fed back, the transmitter determines that the wireless detection signals are not blocked, and when not receiving the information fed back, the transmitter determines that the wireless detection signals are blocked.

In a fourth example, the detection is realized by a mode in which the receiver emits wireless detection signals, and the transmitter determines whether there is a blockage around the optical signal according to a receiving situation (i.e., determines whether the wireless detection signals are blocked). Detecting whether the wireless detection signals are blocked includes: the receiver emits wireless detection signals; the transmitter receives the wireless detection signals, if all of the wireless detection signals are received, determines that the wireless detection signals are not blocked, and if at least one wireless detection signal is not received, determines that the wireless detection signals are blocked.

In the above example, the wireless detection signals include any one or more of following signals in type: an optical signal, a microwave signal, a milli-light wave, a laser signal, or an infrared signal. Although an optical signal may also be used for the detection signal, in this document, unless the context indicates to the contrary, the optical signal refers to an optical signal used for optical communication between a transmitter and a receiver.

In this document, although the detection signal also relates to transmission and reception, a transmitter and a receiver in this document refer to devices that transmit and receive an optical signal.

In the above examples, information fed back between the transmitter and the receiver may be transmitted through a wired channel or a wireless channel, for example, it may be transmitted through the Internet of Things, mobile communication, or the like.

In an illustrative implementation of the present disclosure, transmission of the optical signal is adjusted according to a detection result, including: when it is detected that the wireless detection signals are not blocked, transmission of a first optical signal is started.

When the first optical signal is transmitted, if it is detected that the wireless detection signals are blocked, a second optical signal is transmitted instead or the transmission of the optical signal is suspended; wherein, an intensity of the second optical signal is smaller than that of the first optical signal.

In the illustrative implementation, it may further include: when the second optical signal is transmitted, if it is detected that the second optical signal is not blocked, the first optical signal is transmitted between the transmitter and the receiver instead.

In an implementation of the present disclosure, when switching from the first optical signal to the second optical signal, the intensity of the optical signal decreases, and conversely, when switching from the second optical signal to the first optical signal, the intensity of the optical signal increases. The first optical signal and the second optical signal may be signals of a same type or signals of different types. And the intensity may also use a parameter such as a light intensity, or the like, and an effect is equivalent.

It should be noted that, for an implementation of the present disclosure, the above first optical signal is an optical signal transmitted in an operation mode where there is no blockage, and it is not limited to a specific optical signal, because a different optical signal may also be used due to a requirement of optical communication transmission when there is no blockage. And the second optical signal is not limited to a specific optical signal either, but it needs to be safe for human eyes. Please refer to a related safety standard.

In the above implementation of the present disclosure, when the wireless detection signals are not blocked, the optical signal is started to be transmitted, or the intensity of the optical signal is increased, or the type of the optical signal is adjusted from a relatively low energy density type to a relatively high energy density type.

When the wireless detection signals are blocked, the optical signal is suspended to be transmitted, or the intensity of the optical signal is reduced, or the type of the optical signal is adjusted from a relatively high energy density type to a relatively low energy density type.

The above implementations of the present disclosure provide a communication method of an FSO optical communication system that may guarantee safety of personnel in a link. A key problem of FSO is how to ensure safety of personnel on the link, especially safety of human eyes. If a transmission intensity of an FSO system is directly reduced to ensure the safety of human eyes, coverage range and throughput of the FSO system will be severely limited. And the above-mentioned and subsequent implementations of the present disclosure use a beam of wireless detection signals (such as a microwave, a millimeter wave, a low-power optical signal, etc.) that are safe for human eyes to build a "fence" around an FSO optical path. Before transmission of FSO is started, it is first confirmed that there is no blockage within the "fence", and then transmission of the FSO is started. In a process of transmitting an FSO signal, by using wireless signals forming the "fence", once it is detected that a blockage enters a range of the "fence", transmission of the FSO will be interrupted immediately. Therefore, in the implementations of the present disclosure, transmission of the FSO may be suspended or transmission power may be weakened when a personnel is close to an FSO optical path, and transmission of the FSO is only performed when there is no blockage around the optical path, so that wireless communication may be performed by using an FSO signal with a relatively high intensity while ensuring safety of human eyes, obtaining higher data rate and larger coverage range.

Figure 3:
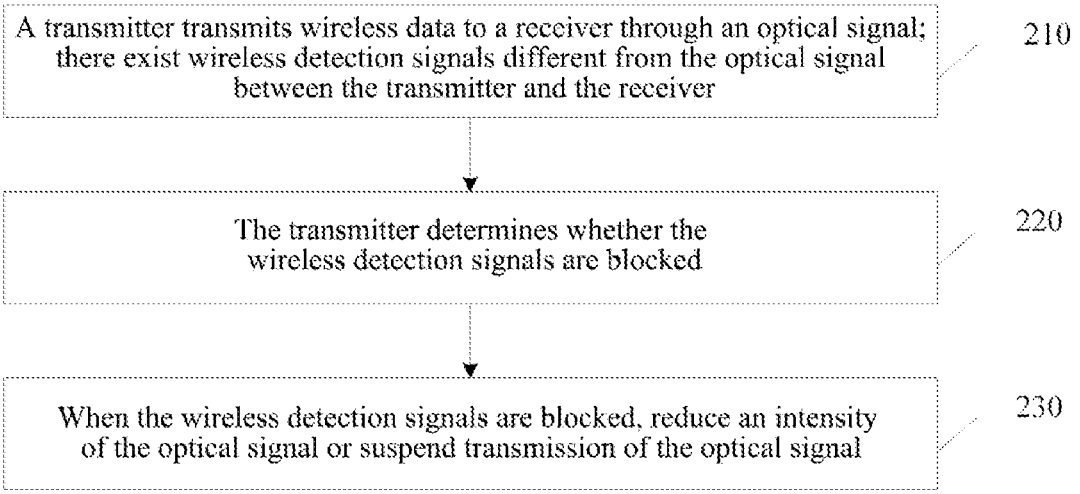
FIG. 3 is a flowchart of an FSO optical communication method performed by a transmitter according to an illustrative implementation of the present disclosure.

In an illustrative implementation of the present disclosure, a free space optical communications method at a transmitter side is provided, as shown in FIG. 3, including acts 210 to 230.

In act 210, a transmitter transmits wireless data to a receiver through an optical signal, wherein there exist wireless detection signals different from the optical signal between the transmitter and the receiver.

In act 220, the transmitter determines whether the detection signals are blocked.

In act 230, when the wireless detection signals are blocked, an intensity of the optical signal is reduced or transmission of the optical signal is suspended.

In the present implementation, the wireless detection signals are distributed around the optical signal.

In an example, the transmitter determines whether the wireless detection signals are blocked, which includes: the transmitter emits the wireless detection signals through a radar, and when part or all of the wireless detection signals are blocked, the transmitter measures a distance between the transmitter and a blockage; if the distance between the transmitter and the blockage is consistent with a distance between the transmitter and the receiver, it is determined that the wireless detection signals are not blocked, and if not consistent, it is determined that the wireless detection signals are blocked.

In an example, the transmitter determines whether the wireless detection signals are blocked, which includes: the transmitter receives, through a wireless channel or a wired channel, indication information of whether there is a blockage around an optical signal fed back by the receiver after radar detection, and determines whether there is a blockage around the optical signal according to the indication information.

In an example, the transmitter determines a detection result for whether wireless detection signals are blocked, including: the transmitter emits wireless detection signals; the transmitter receives feedback information sent by the receiver through a wireless channel or a wired channel; the feedback information is used for indicating that all of the wireless detection signals are received or the wireless detection signals are not blocked, or part or all of the wireless detection signals are not received; and the transmitter determines whether the wireless detection signals are blocked according to information fed back by the receiver.

In an example, the transmitter determines whether the detection signals are blocked, including: the transmitter emits the wireless detection signals; the transmitter receives feedback information continuously sent by the receiver through a wireless channel or a wired channel, wherein the feedback information is used for indicating that all of the wireless detection signals are received or the wireless detection signals are not blocked; and the transmitter determines that the wireless detection signals are not blocked when the feedback information is received, and determines that the wireless detection signals are blocked when the feedback information is not received.

In an example, the transmitter determines whether the wireless detection signals are blocked, including: the transmitter receives wireless detection signals emitted by the receiver, and if all of the wireless detection signals are received, it is determined that the wireless detection signals are not blocked, and if the wireless detection signals are not received or only part of the wireless detection signals are received, it is determined that the wireless detection signals are blocked.

In the above example, the wireless detection signals include any one or more of following signals in type: an optical signal, a microwave signal, a milli-light wave, a laser signal, or an infrared signal.

In the above examples, information fed back between the transmitter and the receiver may be transmitted through a wired channel or a wireless channel, for example, it may be transmitted through the Internet of Things, mobile communication, or the like.

In an illustrative implementation of the present disclosure, the transmitter adjusts the transmission of the optical signal according to the detection result, including: the transmitter starts transmitting a first optical signal to the receiver when detecting that the wireless detection signals are not blocked.

In addition, the transmitter adjusts the transmission of the optical signal according to the detection result, which may further include: when the transmitter transmits the first optical signal, if it detects that the wireless detection signals are blocked, it transmits a second optical signal instead or suspends the transmission of the optical signal; wherein, an intensity of the second optical signal is smaller than that of the first optical signal.

In addition, the transmitter adjusts the transmission of the optical signal according to the detection result, which may further include: when the transmitter transmits the second optical signal, if it detects that the second optical signal is not blocked, it transmits the first optical signal instead.

An illustrative implementation of the present disclosure also provides a free space optical communications method at a receiver side, including: a receiver detects and finds a target and measures a distance of the target through a radar, and the radar emits multiple wireless detection signals which are safe for human eyes, wherein the wireless detection signals are different from an optical signal between the receiver and a transmitter; and the receiver feeds back indication information of whether there is a blockage around the optical signal to the transmitter through a wireless channel or a wired channel.

Herein, the receiver determines whether distances of the target measured by the multiple wireless detection signals are all consistent with a distance of the receiver, if so, feeds back indication information of that there is no blockage around the optical signal, and if not, feeds back indication information of that there is a blockage around the optical signal.

Figure 4:
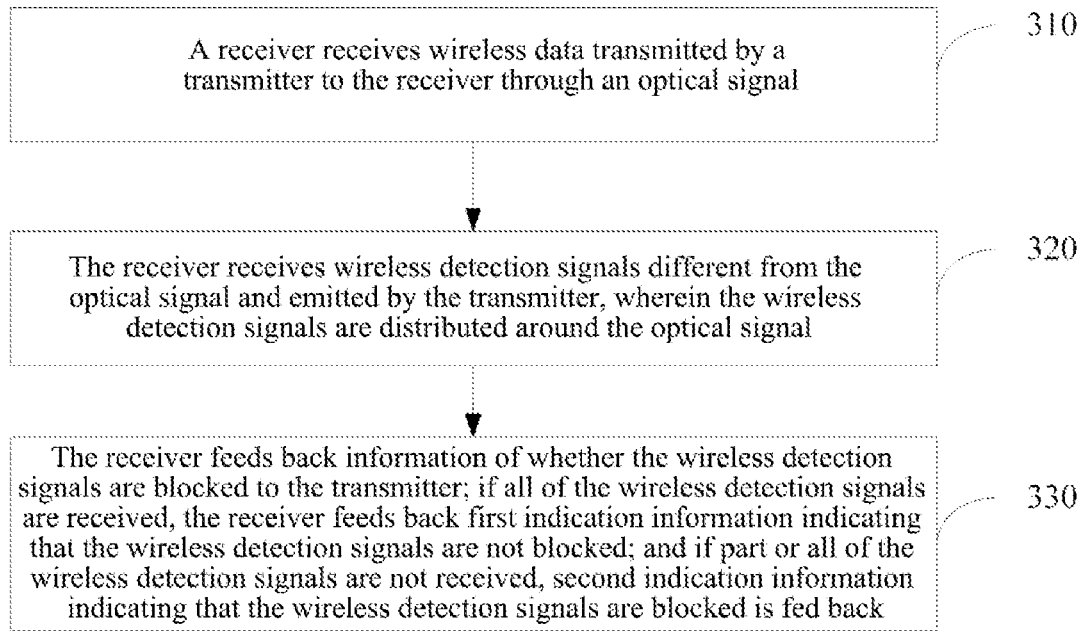
FIG. 4, FIG. 5, and FIG. 6 are flowcharts of an FSO optical communication method executed by a receiver according to an illustrative implementation of the present disclosure, respectively.

An illustrative implementation of the present disclosure also provides a free space optical communications method at a receiver side, as shown in FIG. 4, including acts 310 to 330.

In act 310, a receiver receives wireless data transmitted by a transmitter to the receiver through an optical signal.

In act 320, the receiver receives wireless detection signals different from the optical signal and emitted by the transmitter, wherein the wireless detection signals are distributed around the optical signal.

In act 330, the receiver feeds back information of whether the wireless detection signals are blocked to the transmitter; wherein, if all of the wireless detection signals are received, the receiver feeds back first indication information indicating that the wireless detection signals are not blocked; and if part or all of the wireless detection signals are not received, second indication information indicating that the wireless detection signals are blocked is fed back.

Figure 5:
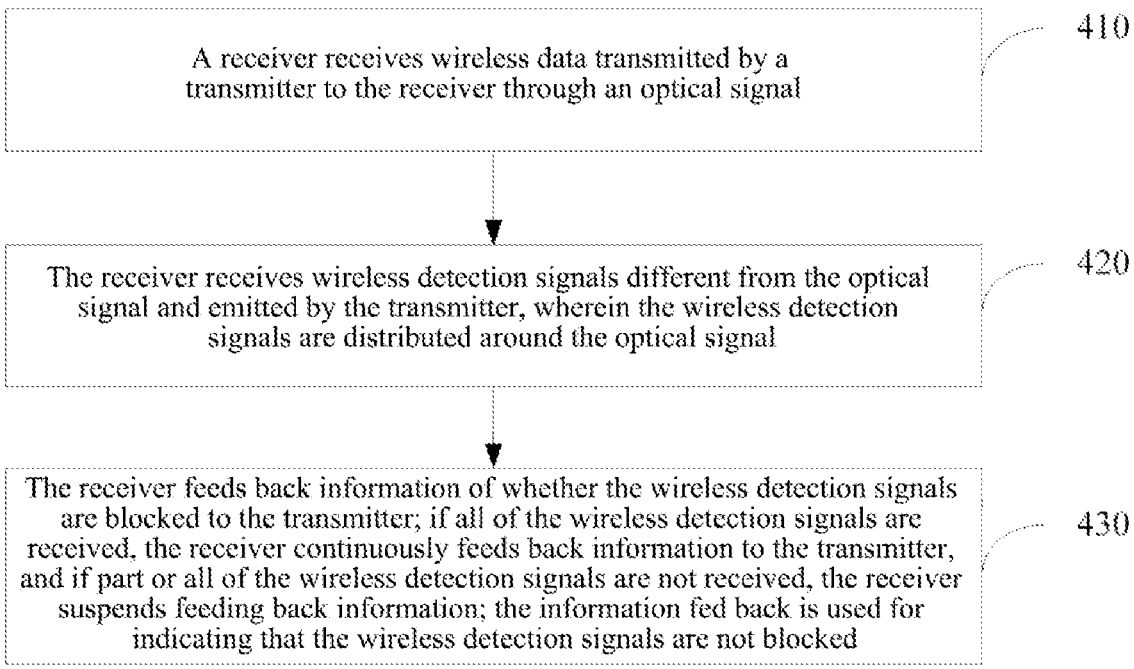

An illustrative implementation of the present disclosure also provides a free space optical communications method at a receiver side, as shown in FIG. 5, including acts 410 to 430.

In act 410, a receiver receives wireless data transmitted by a transmitter to the receiver through an optical signal.

In act 420, the receiver receives wireless detection signals different from the optical signal and emitted by the transmitter, wherein the wireless detection signals are distributed around the optical signal.

In act 430, the receiver feeds back information of whether the wireless detection signals are blocked to the transmitter; wherein, if all of the wireless detection signals are received, the receiver continuously feeds back information to the transmitter, and if part or all of the wireless detection signals are not received, the receiver suspends feeding back information; the information fed back is used for indicating that the wireless detection signals are not blocked.

Figure 6:
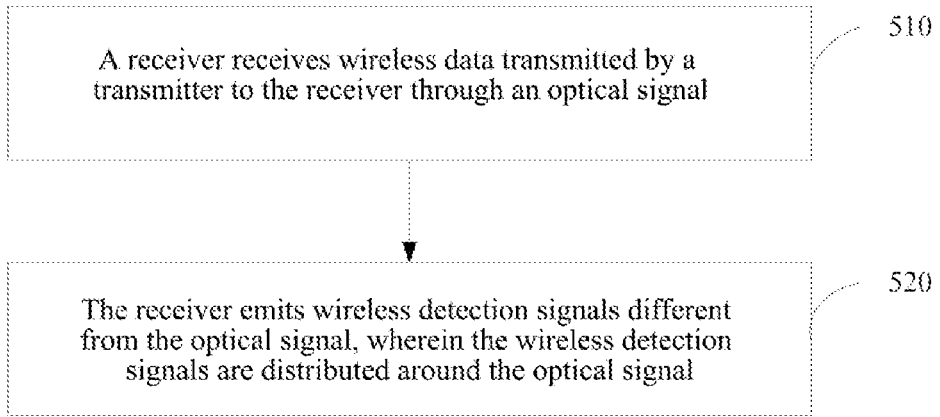

An illustrative implementation of the present disclosure also provides a free space optical communications method at a receiver side, as shown in FIG. 6, including acts 510 to 520.

In act 510, a receiver receives wireless data transmitted by a transmitter to the receiver through an optical signal.

In act 520, the receiver emits wireless detection signals different from the optical signal, wherein the wireless detection signals are distributed around the optical signal.

In any of the free space optical communications methods at a receiver side, the wireless detection signals include any one or more of following signals: an optical signal safe for human eyes; a microwave signal; a milli-light wave signal; a laser signal safe for human eyes; an infrared signal.

Figure 7:
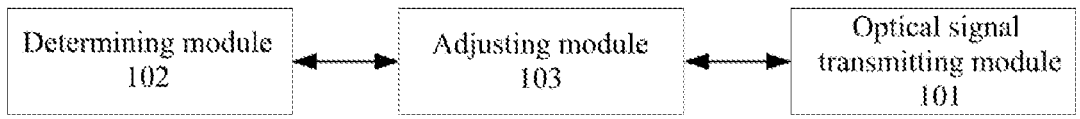
FIG. 7 is a schematic diagram of modules of an FSO transmitter according to an illustrative implementation of the present disclosure.

An illustrative implementation of the present disclosure also provides a transmitter for free space optical communications, as shown in FIG. 7, including: an optical signal transmitting module 101, configured to transmit wireless data to a receiver through an optical signal, wherein there exist wireless detection signals different from the optical signal between the transmitter and the receiver; a determining module 102, configured to determine whether the wireless detection signals are blocked; and an adjusting module 103, configured to reduce an intensity of the optical signal or suspend transmission of the optical signal when the wireless detection signals are blocked.

Herein, the wireless detection signals are distributed around the optical signal.

In an example, the determining module includes: a radar unit, configured to emit the wireless detection signals, and measure a distance between the transmitter and a blockage when part or all of the wireless detection signals are blocked; and a determining unit, configured to determine that the wireless detection signals are not blocked if the distance between the transmitter and the blockage is consistent with a distance between the transmitter and the receiver, and determine that the wireless detection signals are blocked if the distance between the transmitter and the blockage is not consistent with the distance between the transmitter and the receiver.

In an example, the determining module includes: a detection signal emitting unit, configured to emit the wireless detection signals; an information receiving unit, configured to receive feedback information sent by the receiver through a wireless channel or a wired channel, wherein the feedback information is used for indicating that all of the wireless detection signals are received or the wireless detection signals are not blocked, or part or all of the wireless detection signals are not received; and a determining unit, configured to determine whether the wireless detection signals are blocked according to the feedback information sent by the receiver.

In an example, the determining module includes: a detection signal emitting unit, configured to emit the wireless detection signals; an information receiving unit, configured to receive feedback information continuously sent by the receiver through a wireless channel or a wired channel, wherein the feedback information is used for indicating that all of the wireless detection signals are received or the wireless detection signals are not blocked; and a determining unit, configured to determine that the wireless detection signals are not blocked when the feedback information is received, and determine that the wireless detection signals are blocked when the feedback information is not received.

In an example, the determining module includes: an information receiving unit, configured to receive wireless detection signals emitted by the receiver; and a determining unit, configured to determine that the wireless detection signals are not blocked if all of the wireless detection signals are received, and determine that the wireless detection signals are blocked if the wireless detection signals are not received or only part of the wireless detection signals are received.

The wireless detection signals in the above example include any one or more of following signals: an optical signal safe for human eyes, a microwave signal, a milli-light wave signal, a laser signal safe for human eyes, or an infrared signal.

In an illustrative implementation of the present disclosure, the adjusting module includes: a first adjusting unit, configured to control the optical signal transmitting module to start transmitting a first optical signal to the receiver when detecting that the wireless detection signals are not blocked.

The adjusting module may further include a second adjusting unit, configured to control the optical signal transmitting module to transmit a second optical signal instead or suspend transmission of the optical signal if it is detected that the wireless detection signals are blocked when the optical signal transmitting module transmits the first optical signal; wherein, an intensity of the second optical signal is smaller than that of the first optical signal.

The adjusting module may further include a third adjusting unit, configured to control the optical signal transmitting module to transmit the first optical signal instead if it is detected that the second optical signal is not blocked when the optical signal transmitting module transmits the second optical signal.

Figure 8:
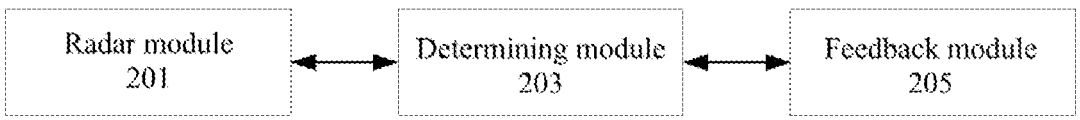
FIG. 8, FIG. 9, FIG. 10, and FIG. 11 are schematic diagrams of modules of an FSO receiver according to an illustrative implementation of the present disclosure, respectively.

In an illustrative implementation of the present disclosure, a receiver for free space optical communications is provided. As shown in FIG. 8, in addition to an optical signal receiving module which is configured to receive an optical signal sent by a transmitter to realize communication, it also includes: a radar module 201, configured to emit wireless detection signals safe for human eyes, detect and find a target and measure a distance of the target, wherein the wireless detection signals are different from an optical signal between the receiver and the transmitter; a determining module 203, configured to determine whether a distance of the target measured by the wireless detection signals is consistent with a distance of the receiver, if so, determine that there is no blockage around the optical signal, and if not, determine that there is a blockage around the optical signal; and a feedback module 205, configured to feed back indication information of whether there is a blockage around the optical signal to the transmitter through a wireless channel or a wired channel.

Figure 9:
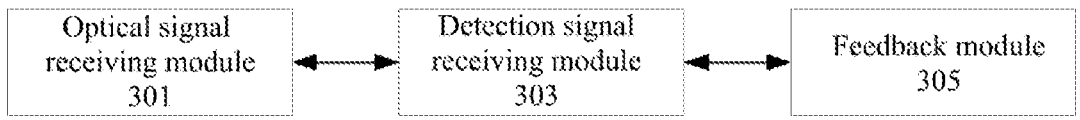

In an illustrative implementation of the present disclosure, a receiver for free space optical communications is provided. As shown in FIG. 9, the receiver for free space optical communications includes: an optical signal receiving module 301, configured to receive wireless data transmitted by a transmitter to the receiver through an optical signal; a detection signal receiving module 303, configured to receive wireless detection signals different from the optical signal and emitted by the transmitter; and a feedback module 305, configured to feed back information of whether the wireless detection signals are blocked to the transmitter through a wireless channel or a wired channel.

Herein, the wireless detection signals emitted by the transmitter are wireless detection signals safe for human eyes, and the wireless detection signals are distributed around the optical signal.

Herein, the detection signal receiving module 303 is configured to receive the wireless detection signals emitted by the transmitter; and the feedback module 305 is configured to feed back information to the transmitter, wherein if all of the wireless detection signals are received, first indication information indicating that the wireless detection signals are not blocked is fed back; and if part or all of the wireless detection signals are not received, second indication information indicating that the wireless detection signals are blocked is fed back.

Figure 10:
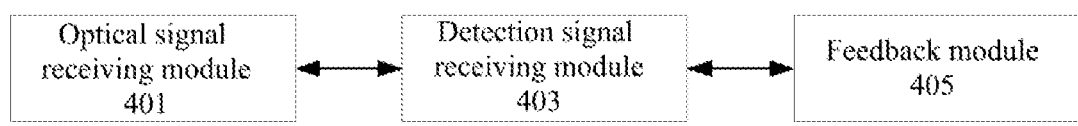

In an illustrative implementation of the present disclosure, a receiver for free space optical communications is provided. As shown in FIG. 10, the receiver for free space optical communications includes: an optical signal receiving module 401, configured to receive wireless data transmitted by a transmitter to the receiver through an optical signal; a detection signal receiving module 403, configured to receive wireless detection signals different from the optical signal and emitted by the transmitter; and a feedback module 405, configured to feed back information of whether the wireless detection signal is blocked to the transmitter through a wireless channel or a wired channel.

Herein, the wireless detection signals emitted by the transmitter are wireless detection signals safe for human eyes, and the wireless detection signals are distributed around the optical signal.

The detection signal receiving module 403 is configured to receive the wireless detection signals emitted by the transmitter; and the feedback module 405 is configured to continuously feed back information to the transmitter if all of the wireless detection signals are received, and suspend feeding back information if part or all of the wireless detection signals are not received; the information fed back is used for indicating that the wireless detection signal is not blocked.

Figure 11:
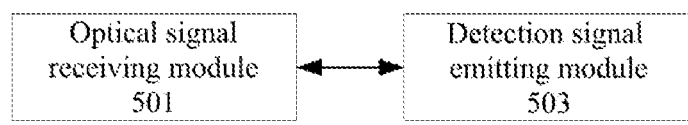

In an illustrative implementation of the present disclosure, a receiver for free space optical communications is provided. As shown in FIG. 11, the receiver for free space optical communications includes: an optical signal receiving module 501, configured to receive wireless data transmitted by a transmitter to the receiver through an optical signal; and a detection signal emitting module 503, configured to emit wireless detection signals different from the optical signal, wherein the wireless detection signals are distributed around the optical signal.

In any of the above implementations, the wireless detection signals include any one or more of following signals: an optical signal safe for human eyes, a microwave signal, a milli-light wave signal, a laser signal safe for human eyes, or an infrared signal.

Figure 12:
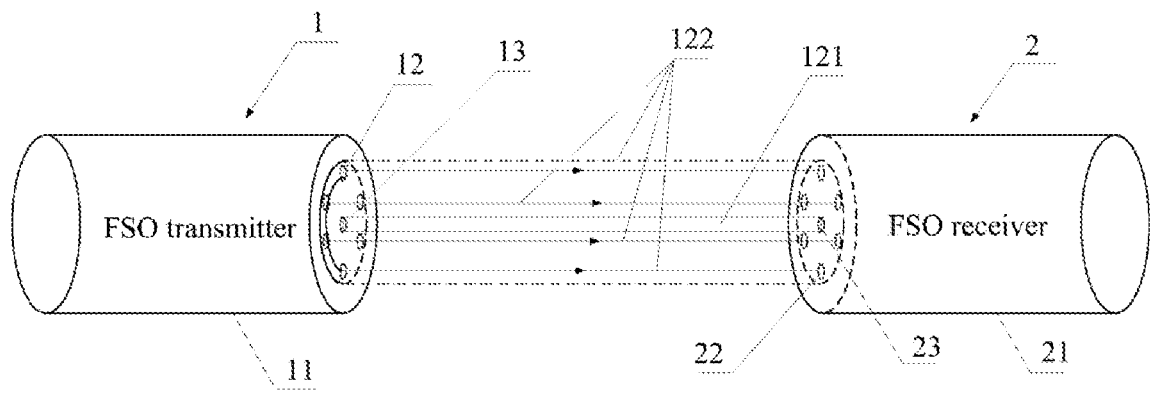
FIG. 12 is a schematic structural diagram of an FSO optical communication system according to an illustrative implementation of the present disclosure.

In an illustrative implementation of the present disclosure, as shown in FIG. 12, an FSO optical communication system includes an FSO transmitter 1 and an FSO receiver 2, wherein the FSO transmitter 1 and the FSO receiver 2 communicate wirelessly through an optical signal, and an FSO optical path 121 (also called an optical path 121) of the optical signal is located between the FSO transmitter 1 and the FSO receiver 2. Multiple detection signals are also transmitted between the FSO transmitter 1 and the FSO receiver 2. Transmission paths 122 of the multiple detection signals form a detection area around the optical path 121 of the optical signal, which surrounds the FSO optical path 121 (that is, building an electronic fence around the optical path 121). If a blockage enters the detection area, the transmission paths 122 of the detection signals will be blocked (that is, the electronic fence will be touched), and a system may detect it in time, so as to switch the optical signal or adjust an intensity of the optical signal, such as changing the intensity or the type of the optical signal. As shown in FIG. 12, the optical signal is transmitted through an optical signal transmitting hole 13 on a housing 11 of the FSO transmitter 1 and received through an optical signal receiving hole 23 on a housing 21 of the FSO receiver 2. And the detection signals may be emitted through detection holes 12 (six are shown in the figure, but it may also be two, three, four, five, seven, eight, or more) on the housing 11 of the FSO transmitter 1, and received through detection holes 22 on the housing 21 of the FSO receiver 2. The detection signals may also be emitted through the detection holes 12 on the housing 21 of the FSO receiver 2 and received through the detection holes 12 on the housing 11 of the FSO transmitter 1.

The above-mentioned FIG. 12 shows an external structure of a transmitter and a receiver of FSO, and a corresponding hardware structure of the transmitter and the receiver will be explained by another implementation below.

In an illustrative implementation of the present disclosure, a transmitter for free space optical communications is provided, including a housing with an optical signal transmitting hole and an optical signal transmitting device installed on the housing, and further including a detecting device and an optical signal adjusting device installed on the housing, wherein the detecting device is configured to acquire a detection result of whether there is a blockage around an optical signal, the optical signal is transmitted between a transmitter and a receiver; and the optical signal adjusting device is configured to adjust transmission of the optical signal of the optical signal transmitting device according to the detection result, so as to limit a transmission intensity of the optical signal or suspend the transmission of the optical signal when there is a blockage around the optical signal.

In the present implementation, the detecting device and/or the optical signal adjusting device may be installed in the housing, but the present disclosure is not limited to this, and the detecting device and/or the optical signal adjusting device may also be wholly or partially disposed outside the housing.

In an example, the detecting device includes: a radar, configured to emit multiple wireless detection signals which are safe for human eyes, find a target and measure distances of the target, wherein the multiple wireless detection signals are distributed around the optical signal; and a processor, configured to determine whether the distances of the target measured by the multiple wireless detection signal are all consistent with a distance of the receiver, if so, determine that there is no blockage around the optical signal, and if not, determine that there is a blockage around the optical signal.

In an example, the detecting device includes: a communication module, configured to receive, through a wireless channel or a wired channel, indication information of whether there is a blockage around the optical signal fed back by the receiver after radar detection; and a processor, configured to determine whether there is a blockage around the optical signal according to the indication information.

In an example, the detecting device includes: a detection signal emitter, configured to emit multiple wireless detection signals safe for human eyes, wherein the multiple wireless detection signals are distributed around the optical signal; a communication module, configured to receive, through a wireless channel or a wired channel, indication information of whether there is a blockage around the optical signal fed back by the receiver; and a processor, configured to determine whether there is a blockage around the optical signal according to the indication information.

In an example, the detecting device includes: a detection signal emitter, configured to emit multiple wireless detection signals safe for human eyes, wherein the multiple wireless detection signals are distributed around the optical signal; a communication module, configured to receive, through a wireless channel or a wired channel, a receiving result of the multiple wireless detection signals fed back by the receiver; and a processor, configured to determine that there is no blockage around the optical signal if the receiving result is that all of the multiple wireless detection signals are received, and determine that there is a blockage around the optical signal if it is that at least one wireless detection signal is not received.

In the above example, the housing is provided with multiple detection signal emitting holes for emitting the multiple wireless detection signals, wherein the multiple detection signal emitting holes are disposed around the optical signal transmitting hole; the wireless detection signals include any one or more of following signals: an optical signal, a microwave signal, a milli-light wave signal, a laser signal safe for human eyes, or an infrared signal.

In an example, the detecting device includes: a detection signal receiver, configured to receive multiple wireless detection signals which are emitted by the receiver and safe for human eyes, wherein the multiple wireless detection signals are distributed around the optical signal; and a processor, configured to determine that there is no blockage around the optical signal if all of the multiple wireless detection signals are received, and determine that there is a blockage around the optical signal if at least one wireless detection signal is not received.

In an illustrative implementation of the present disclosure, the optical signal adjusting device adjusts the transmission of the optical signal according to the detection result, including: controlling the optical signal transmitting device to start transmitting a first optical signal to a receiver when the detecting device determines that there is no blockage around the optical signal according to the detection result; when the optical signal transmitting device transmits the first optical signal, if the detecting device determines that there is a blockage around the optical signal according to the detection result, controlling the optical signal transmitting device to transmit a second optical signal that is safe for human eyes or suspend the transmission of the optical signal instead; wherein, an intensity of the second optical signal is smaller than that of the first optical signal.

The optical signal adjusting device adjusts the transmission of the optical signal according to the detection result, which may further include: when the optical signal transmitting device transmits the second optical signal, if the detecting device determines that there is no blockage around the optical signal according to the detection result, controlling the optical signal transmitting device to transmit the first optical signal instead.

The above-mentioned optical signal adjusting device may be realized by using a device such as IC with a logic operation function, such as a processor, a programmable logic controller, or the like.

In an illustrative implementation of the present disclosure, a receiver for free space optical communications is provided, which includes a housing with an optical signal receiving window and an optical signal receiving device installed on the housing, wherein the receiver further includes a radar, a processor, and a communication module installed on the housing.

The radar is configured to emit multiple wireless detection signals which are distributed around the optical signal and safe for human eyes, detect and find a target and measure distances of the target, wherein the wireless detection signal is different from the optical signal. The processor is configured to determine whether the distances of the target measured by the multiple wireless detection signals are all consistent with a distance of the receiver, if so, determine that there is no blockage around the optical signal, and if not, determine that there is a blockage around the optical signal. The communication module is configured to feed back indication information of whether there is a blockage around the optical signal to the transmitter through a wireless channel or a wired channel.

In an illustrative implementation of the present disclosure, a receiver for free space optical communications is provided, which includes a housing with an optical signal receiving window and an optical signal receiving device installed on the housing. The receiver further includes: a detection signal receiver, installed on the housing, and configured to receive multiple wireless detection signals which are emitted by a transmitter and safe for human eyes, wherein the multiple wireless detection signals are distributed around an optical signal between the receiver and the transmitter; and a communication module, configured to feed back a receiving result of the multiple wireless detection signals to the transmitter.

In an illustrative implementation of the present disclosure, a receiver for free space optical communications is provided, which includes a housing with an optical signal receiving window and an optical signal receiving device installed on the housing. The receiver further includes: a detection signal receiver, installed on the housing, and configured to receive multiple wireless detection signals emitted by a transmitter and safe for human eyes, wherein the multiple wireless detection signals are distributed around the optical signal between the receiver and the transmitter; a processor, configured to acquire a receiving result of the detection signal receiver, and determine that there is no blockage around the optical signal if all the multiple wireless detection signals are received, and determine that there is a blockage around the optical signal if at least one wireless detection signal is not received; and a communication module, configured to feed back indication information of whether there is a blockage around the optical signal determined by the processor to the transmitter.

In an illustrative implementation of the present disclosure, a receiver for free space optical communications is provided, which includes a housing with an optical signal receiving window and an optical signal receiving device installed on the housing. The receiver further includes: a detection signal receiver, installed on the housing, and configured to receive multiple wireless detection signals emitted by a transmitter and safe for human eyes, wherein the multiple wireless detection signals are distributed around an optical signal between the receiver and the transmitter; and a communication module, configured to continuously feed back information to the transmitter if the multiple wireless detection signals are received, and suspend feeding back information if at least one wireless detection signal is not received; the information fed back is used for indicating that there is no blockage around the optical signal.

In an illustrative implementation of the present disclosure, a receiver for free space optical communications is provided, which includes a housing with an optical signal receiving window and an optical signal receiving device installed on the housing. The receiver further includes: a detection signal emitter, configured to emit multiple wireless detection signals safe for human eyes, wherein the multiple wireless detection signals are distributed around the optical signal.

In an example, the housing is provided with multiple detection signal emitting holes for emitting the multiple wireless detection signals, wherein the multiple detection signal emitting holes are disposed around the optical signal receiving window. The wireless detection signals include any one or more of following signals: an optical signal, a microwave signal, a milli-light wave signal, a laser signal safe for human eyes, or an infrared signal.

The above implementations of the transmitter and the receiver are used to implement FSO optical communication methods of the previous implementations, respectively.

Different operation modes of the above implementations will be explained below with reference to the accompanying drawings.

Figure 13:
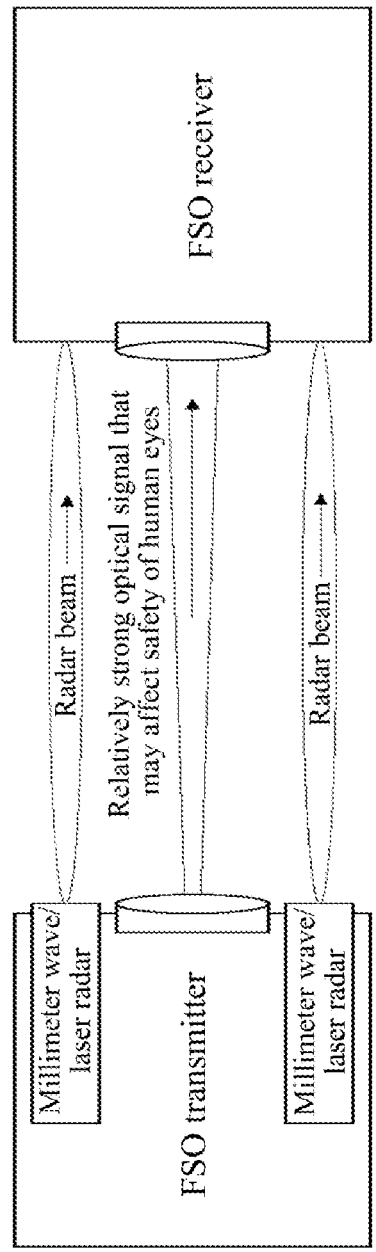
FIG. 13 is a schematic diagram of that transmission of a relatively strong FSO optical signal may be performed when a radar does not detect a blockage in an illustrative implementation of the present disclosure.

In an illustrative implementation of the present disclosure, a detection signal is generated by using a millimeter wave or a laser radar. As shown in FIG. 13, a radar is disposed in an FSO transmitter, multiple millimeter wave or laser radar signal sources are disposed around an FSO transmitting hole, and corresponding holes are disposed on a housing of the transmitter, generating multiple millimeter wave or laser radar signals around an FSO optical path. When no blockage is detected by all millimeter wave or laser radar signals, it may be determined that there is no blockage around the FSO optical path, and transmission of a relatively strong FSO optical signal that may affect safety of human eyes may be started or continued, obtaining relatively large coverage and relatively high transmission rate.

Figure 14:
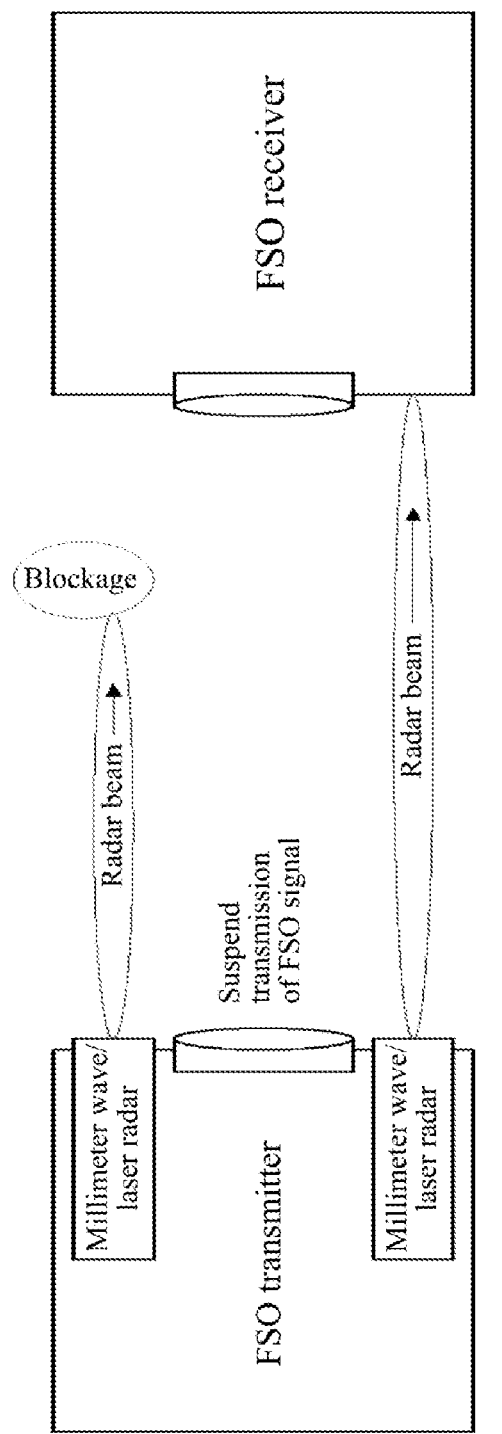
FIG. 14 is a schematic diagram of suspending transmission of an FSO optical signal when a radar detects a blockage in an illustrative implementation of the present disclosure.
Figure 15:
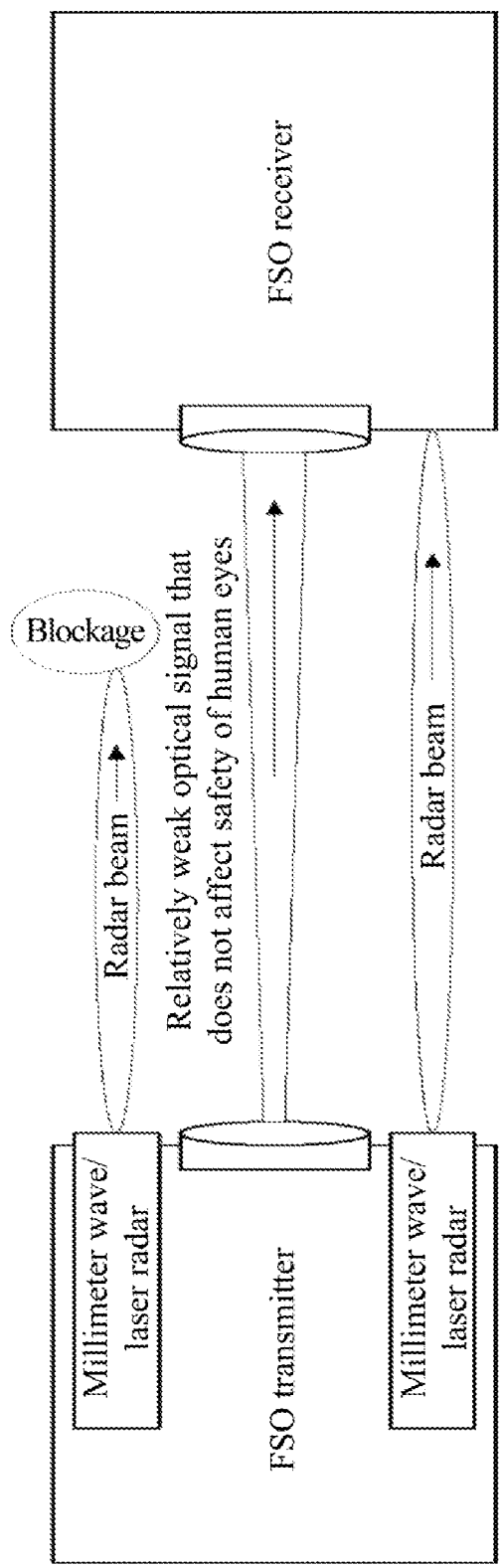
FIG. 15 is a schematic diagram of switching to transmission of a relatively weak FSO optical signal when a radar detects a blockage in an illustrative implementation of the present disclosure.

When a blockage is detected by the millimeter wave or laser radar signal, it may be determined that a blockage appears around the FSO optical path, then an FSO transmitter suspends transmission of an FSO optical signal, as shown in FIG. 14. In another example, at this time, it may also be switched to a relatively weak light signal that does not affect safety of human eyes, as shown in FIG. 15, to ensure personal safety.

By using the present implementation, transmission of FSO may be suspended or transmission power may be weakened when a personnel is close to an FSO optical path, and transmission of the FSO is only performed when there is no blockage around the optical path, so that wireless communication may be performed by using an FSO signal with a relatively high intensity while ensuring safety of human eyes, obtaining higher data rate and larger coverage range. In the present implementation, a blockage is detected by using a radar, devices for receiving and emitting detection signals are not needed to be installed at an FSO receiver, thus reducing complexity of device. A blockage is detected without depending on cooperation of receiving and transmitting ends, which has relatively high reliability.

In an illustrative implementation of the present disclosure, a transmitter emits detection signals to a receiver, and the receiver feeds back information to indicate whether a blockage appears.

Figure 16:
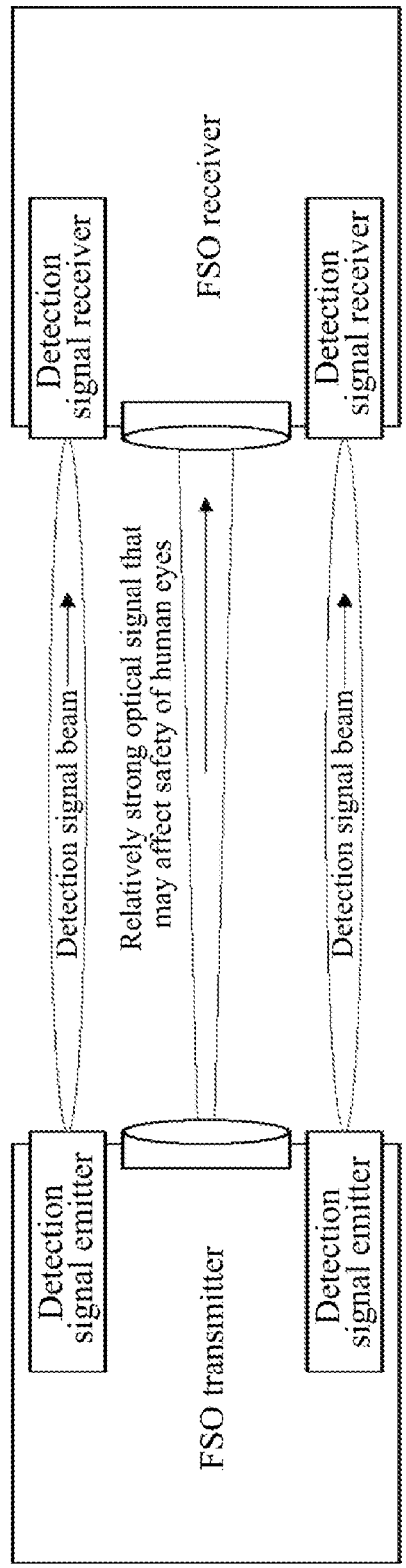
FIG. 16 is a schematic diagram of that an FSO transmitter may perform transmission of a relatively strong FSO optical signal when an FSO receiver does not detect a blockage in an illustrative implementation of the present disclosure.

As shown in FIG. 16, in an FSO transmitter, multiple detection signal emitters are disposed around an FSO transmitting hole, and corresponding detection holes are disposed on housings of the transmitter and a receiver. Multiple detection signals are emitted around an FSO optical path. The detection signals are received by the FSO receiver. When the FSO receiver can receive all the detection signals, it may be determined that there is no blockage around the FSO optical path, then the FSO transmitter may start or continue transmission of a relatively strong FSO optical signal that may affect safety of human eyes, obtaining relatively large coverage and relatively high transmission rate.

Figure 17:
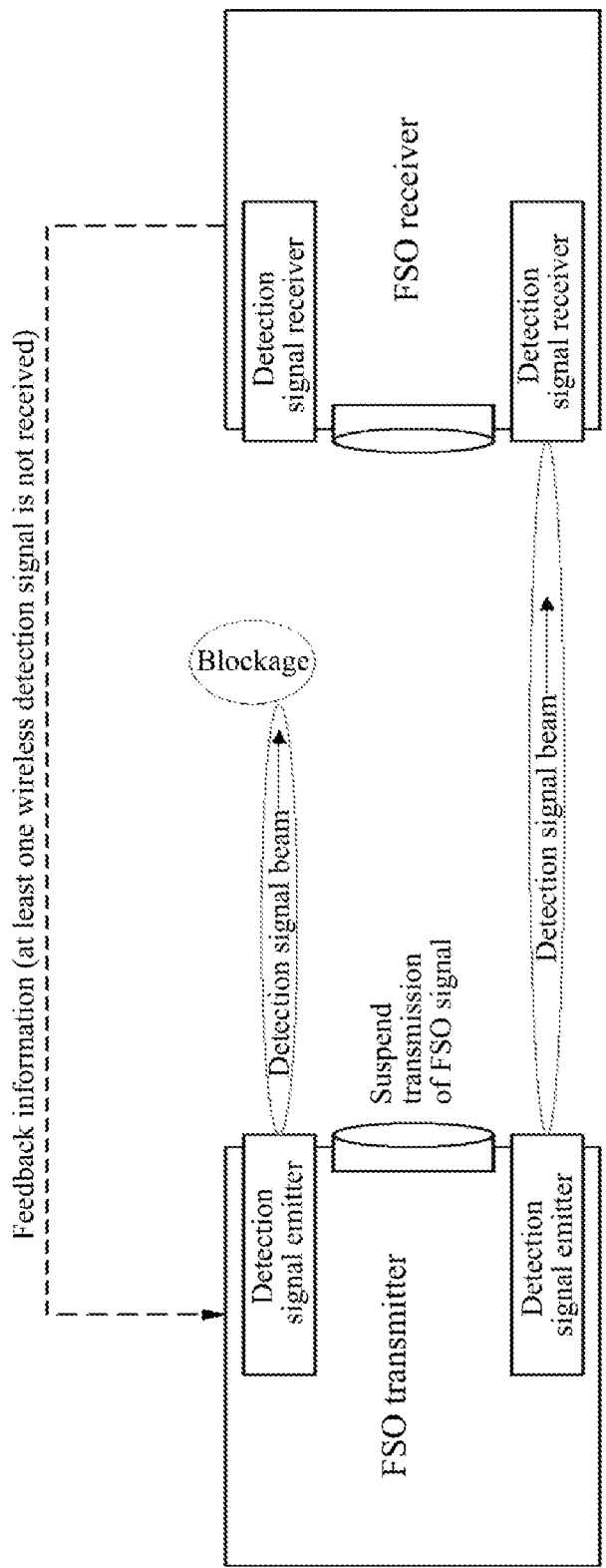
FIG. 17 is a schematic diagram of that an FSO transmitter suspends transmission of an FSO optical signal when a feedback signal indicates that a blockage is detected in an illustrative implementation of the present disclosure.
Figure 18:
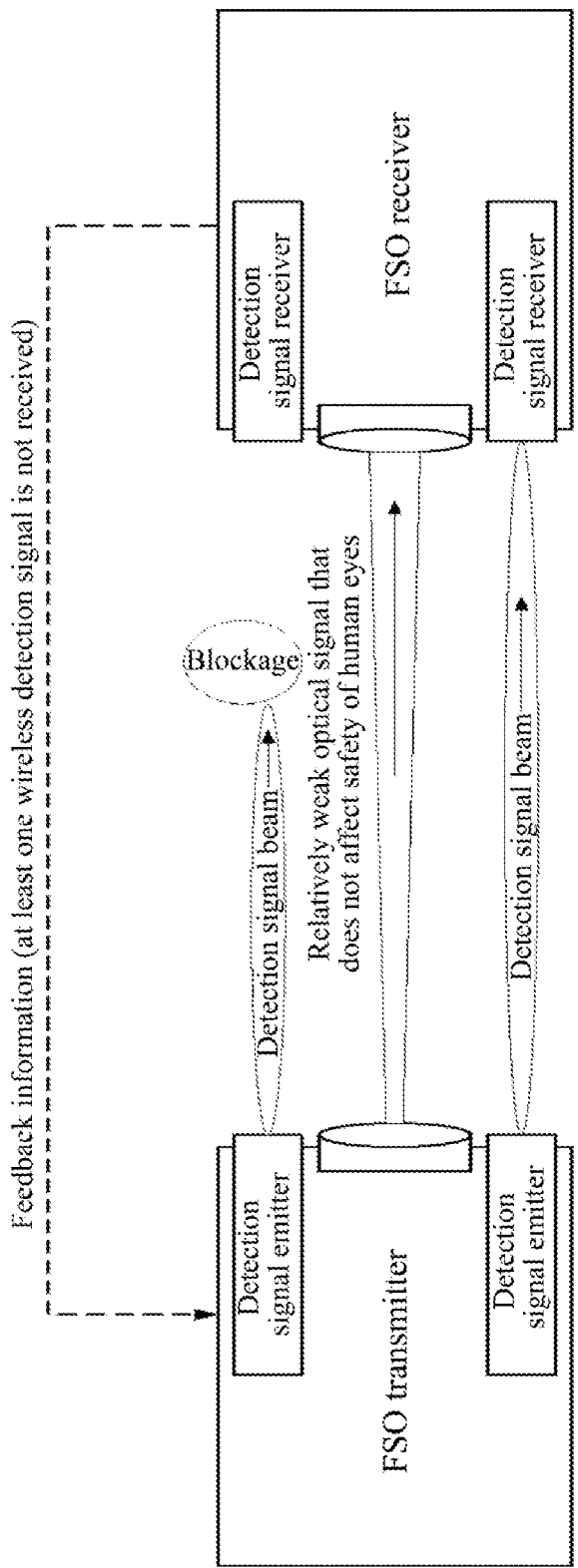
FIG. 18 is a schematic diagram of that an FSO transmitter switches to transmission of a relatively weak FSO optical signal when a feedback signal indicates that a blockage is detected in an illustrative implementation of the present disclosure.

When the FSO receiver cannot receive the detection signals, it means that at least one detection signal is blocked by a blockage, then it may be determined that a blockage appears around the FSO optical path, then the FSO receiver sends feedback information to the FSO transmitter to indicate that a blockage appears. After receiving the feedback information, the FSO transmitter suspends the transmission of the FSO optical signal, as shown in FIG. 17. In another example, at this time, it may also be switched to a relatively weak light signal that does not affect safety of human eyes, as shown in FIG. 18, to ensure personal safety.

By using the present implementation, transmission of FSO may be suspended or transmission power may be weakened when a personnel is close to an FSO optical path, and transmission of the FSO is only performed when there is no blockage around the optical path, so that wireless communication may be performed by using an FSO signal with a relatively high intensity while ensuring safety of human eyes, obtaining higher data rate and larger coverage range. Compared with the implementation using radar detection, in the present implementation, a mode of sending detection signals at an FSO transmitter and receiving them at an FSO receiver is used, thus problems of limited radar detection distance, reduced long-distance detection accuracy, difficulty in distinguishing a blockage from the FSO receiver, etc. may be solved, and a blockage around an FSO optical path may be detected at a longer distance and more accurately.

In an illustrative implementation of the present disclosure, a transmitter emits wireless detection signals (also abbreviated as detection signals herein) to a receiver, and the receiver continuously feeds back signals, while suspends feeding back information when a blockage appears.

Figure 19:
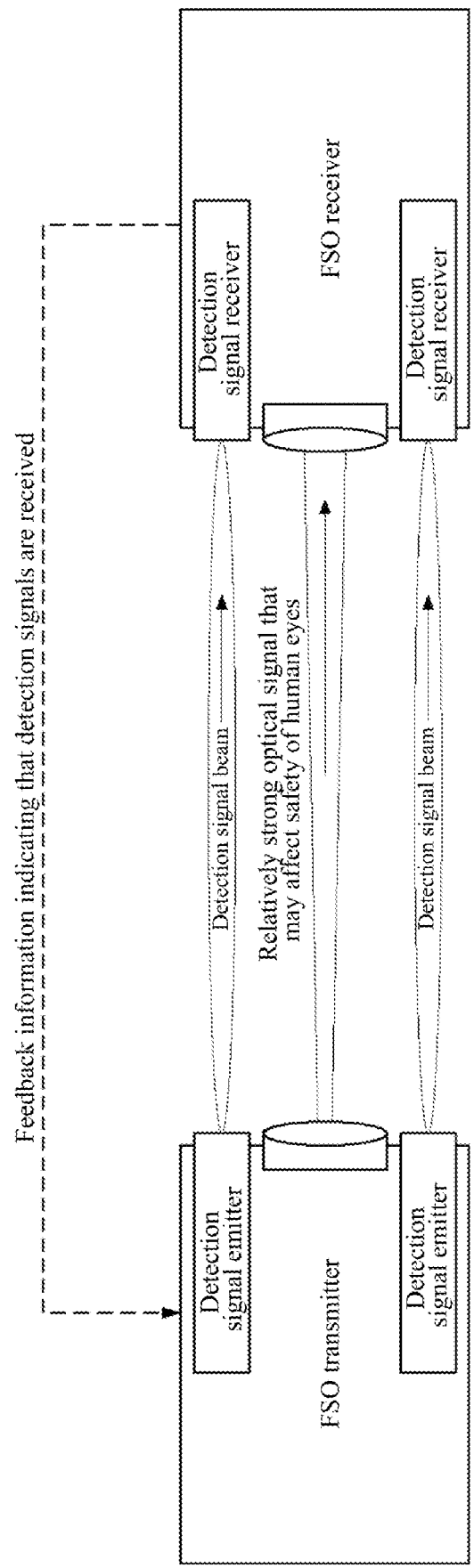
FIG. 19 is a schematic diagram of that when an FSO receiver does not detect a blockage, feedback information is continuously sent to an FSO transmitter, and the FSO transmitter may perform transmission of a relatively strong FSO optical signal.

As shown in FIG. 19, in an FSO transmitter, multiple detection signal emitters are disposed around an FSO transmitting hole, and corresponding detection holes are disposed on housings of the transmitter and a receiver so as to emit multiple detection signals around an FSO optical path, the detection signals are received by the FSO receiver. When the FSO receiver may receive all the detection signals and no blockage is detected, the FSO receiver continuously sends feedback signals to the FSO transmitter, indicating that there is no blockage around the FSO optical path, then the FSO transmitter may start or continue transmission of a relatively strong FSO optical signal that may affect safety of human eyes, obtaining relatively large coverage and relatively high transmission rate.

Figure 20:
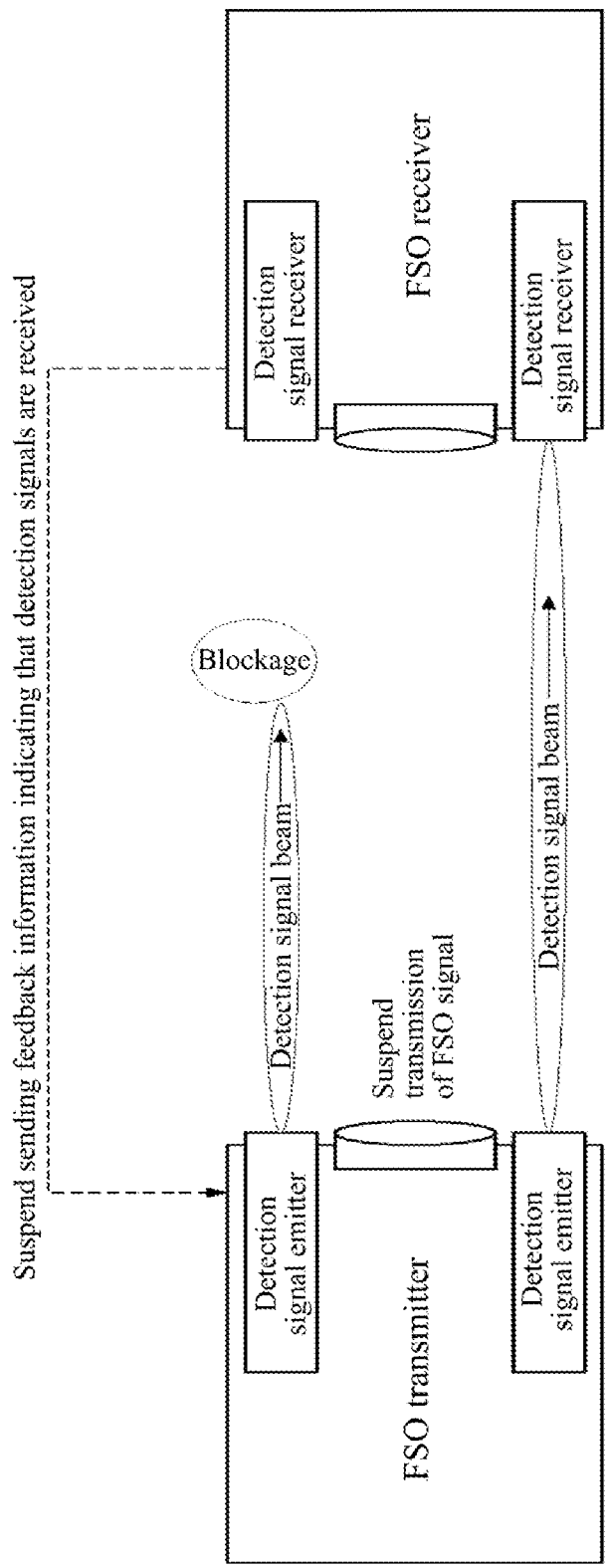
FIG. 20 is a schematic diagram of that when a blockage is detected, an FSO receiver suspends sending feedback information indicating that detection signals are received, and an FSO transmitter suspends transmission of an FSO optical signal.
Figure 21:
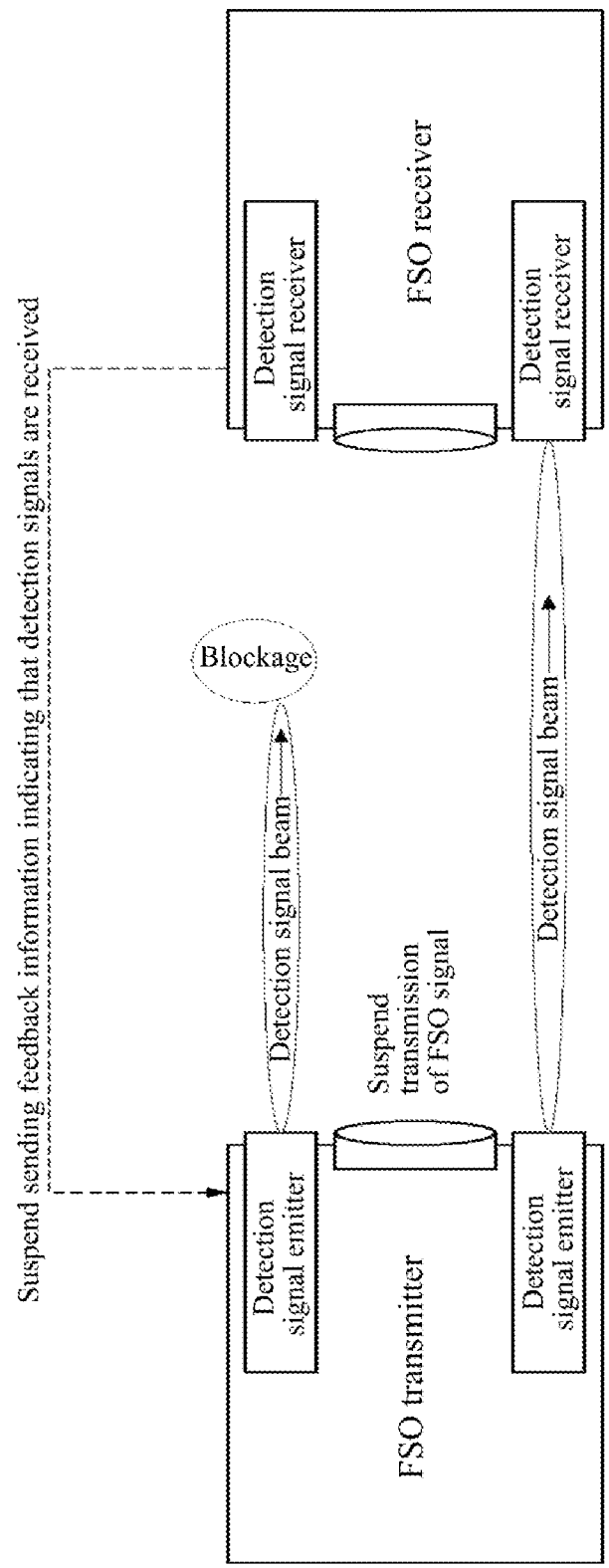
FIG. 21 is a schematic diagram of that when a blockage is detected, an FSO receiver suspends sending feedback information indicating that detection signals are received, and an FSO transmitter switches to transmission of a relatively weak FSO optical signal.

When the FSO receiver cannot receive the detection signals, it means that at least one detection signal is blocked by a blockage, then it may be determined that a blockage appears around the FSO optical path, then the FSO receiver suspends sending feedback information indicating that the detection signals are received to the FSO transmitter, to indicate that there is a blockage around the FSO optical path, then the FSO transmitter suspends transmission of an FSO optical signal, as shown in FIG. 20. In another example, at this time, it may also be switched to a relatively weak light signal that does not affect safety of human eyes, as shown in FIG. 21, to ensure personal safety.

By using the present implementation, transmission of FSO may be suspended or transmission power may be weakened when a personnel is close to an FSO optical path, and transmission of the FSO is only performed when there is no blockage around the optical path, so that wireless communication may be performed by using an FSO signal with a relatively high intensity while ensuring safety of human eyes, obtaining higher data rate and larger coverage range. Compared with the implementation using radar detection, in the present implementation, a mode of sending detection signals at an FSO transmitter and receiving them at an FSO receiver is used, thus problems of limited radar detection distance, reduced long-distance detect accuracy, difficulty in distinguishing a blockage from the FSO receiver, etc. may be solved, and the blockage around an FSO optical path may be detected at a longer distance and more accurately. Compared with a mode in which the receiver sends feedback information when it finds a blockage, the present implementation can also solve a problem of failing in detecting feedback information, that is, if the FSO transmitter has failed in detecting feedback information sent by the FSO receiver indicating that detection signals are received, it will also suspend transmission of an FSO optical signal, or switch to a relatively weak optical signal that does not affect safety of human eyes, thus personal safety may be ensured even if the feedback information is failed to be detected.

In an illustrative implementation of the present disclosure, a transmitter determines whether a blockage exists by using detection signals from a receiver to the transmitter.

Figure 22:
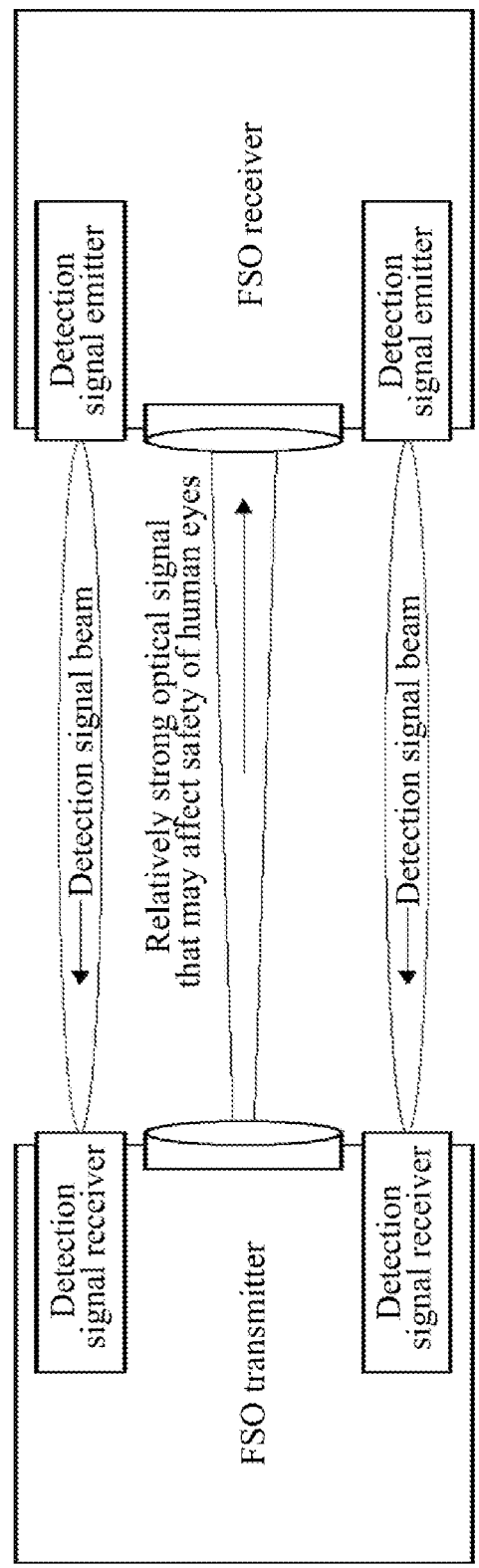
FIG. 22 is a schematic diagram of that when an FSO transmitter receives all of the detection signals, transmission of a relatively strong FSO optical signal may be performed.

As shown in FIG. 22, in the FSO receiver, multiple detection signal emitters are disposed around an FSO receiving window, and corresponding detection holes are disposed on housings of the transmitter and the receiver, so as to transmit multiple detection signals around an FSO optical path. The detection signals are received by the FSO transmitter. When the FSO transmitter can receive all of the detection signals, it may be determined that there is no blockage around the FSO optical path, then the FSO transmitter may start or continue performing transmission of a relatively strong FSO optical signal that may affect safety of human eyes, to obtain relatively large coverage and relatively high transmission rate.

Figure 23:
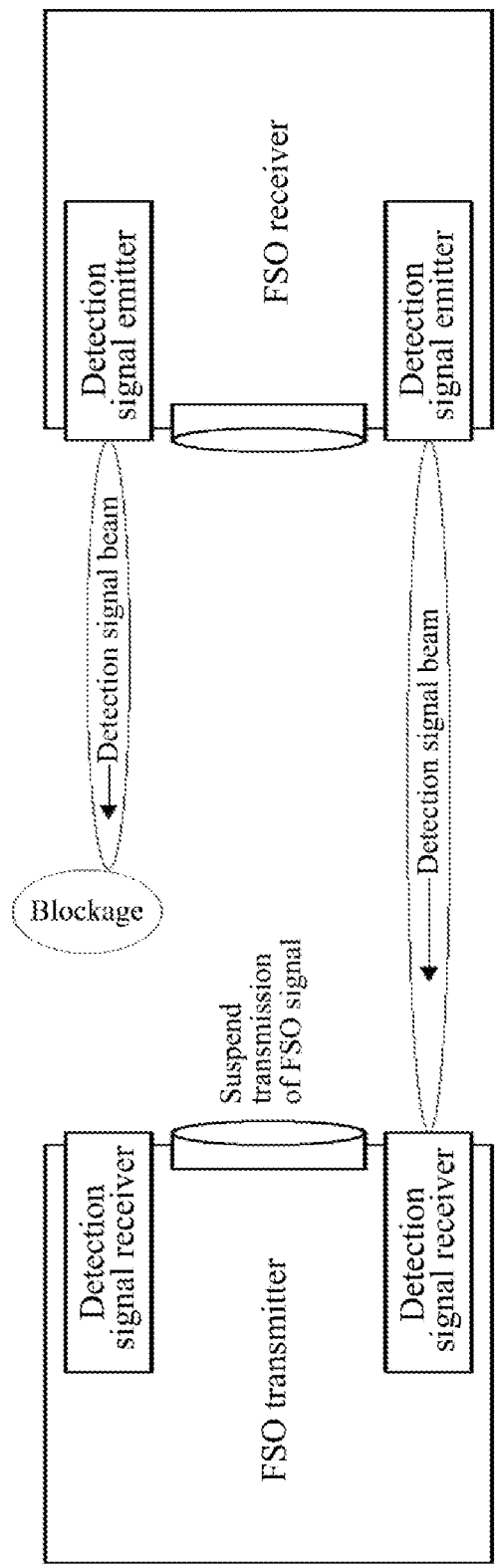
FIG. 23 is a schematic diagram of suspending transmission of an FSO optical signal when an FSO transmitter cannot receive detection signals.
Figure 24:
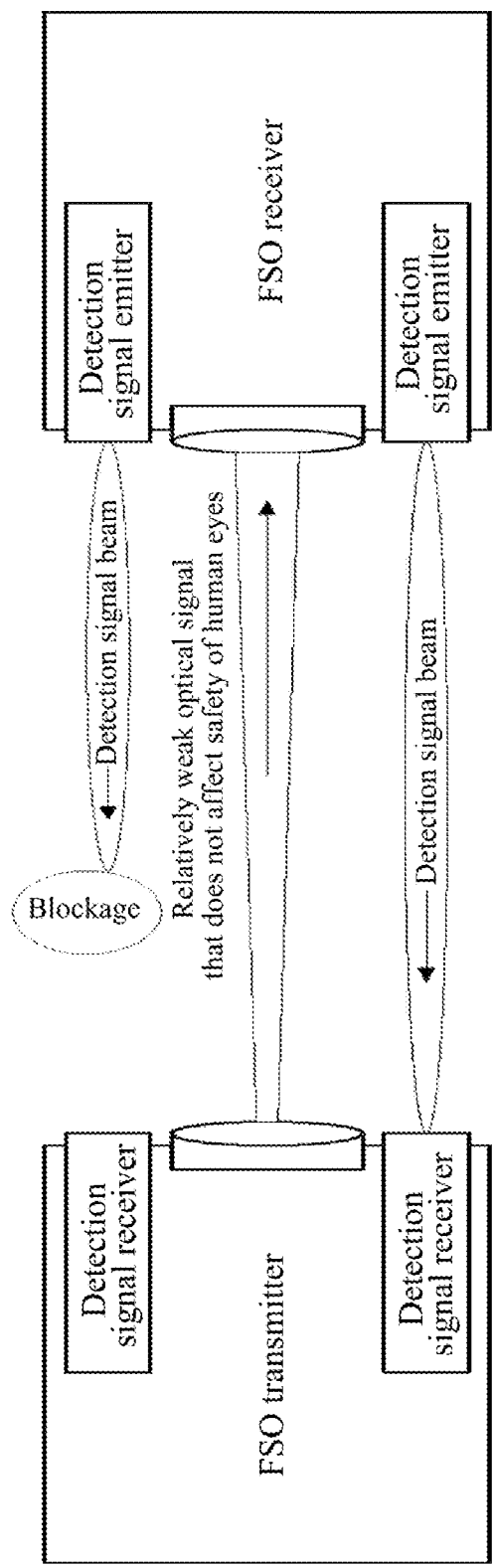
FIG. 24 is a schematic diagram of switching to transmission of a relatively weak FSO optical signal when an FSO transmitter cannot receive detection signals.

When the FSO transmitter cannot receive the detection signals, it means that at least one detection signal is blocked by a blockage, then it may be determined that a blockage appears around the FSO optical path, then the FSO transmitter suspends transmission of the FSO optical signal, as shown in FIG. 23. In another example, at this time, it may also be switched to a relatively weak light signal that does not affect safety of human eyes, as shown in FIG. 24, to ensure personal safety.

By using the present implementation, transmission of FSO may be suspended or transmission power may be weakened when a personnel is close to an FSO optical path, and transmission of the FSO is only performed when there is no blockage around the optical path, so that wireless communication may be performed by using an FSO signal with a relatively high intensity while ensuring safety of human eyes, obtaining higher data rate and larger coverage range. Compared with the implementation in which radar detection is used, in the present implementation, a mode of sending detection signals at an FSO receiver and receiving them at an FSO transmitter is used, problems of limited radar detection distance, reduced long-distance detect accuracy, difficulty in distinguishing a blockage from the FSO receiver, etc. may be solved, and a blockage around an FSO optical path may be detected at a longer distance and more accurately. Compared with a mode in which the receiver feeds back information, in the present implementation, transmission of feedback information is omitted, which may reduce overhead of wireless signaling, improve utilization efficiency of a wireless link, and meanwhile may also avoid feedback delay, speed up response speed of an FSO transmitter, and be more conducive to ensuring personal safety.

In an FSO system, a coverage distance and a data rate which are realizable are related to an intensity of an optical signal. The greater the intensity of the optical signal, the farther the coverage distance and the higher the data rate. However, a relatively strong optical signal may harm a human body (especially human eyes). For terrestrial wireless communication, since optical paths often pass through areas where people appear, in order to protect safety of human eyes, transmission is only performed with a relatively low power, thus a long-distance coverage and high data rate transmission cannot be realized.

In an implementation of the present disclosure, transmission of FSO may be suspended or transmission power may be weakened when a personnel is close to an FSO optical path, and transmission of the FSO is only performed when there is no blockage around the optical path, so that wireless communication may be performed by using an FSO signal with a relatively high intensity while ensuring safety of human eyes, obtaining a higher data rate and a larger coverage range.

In addition to sending detection signals to detect a blockage in the above implementations of the present disclosure, it may be determined whether there is a blockage around an FSO optical path by using a camera and AI image recognition.

It can be understood by those skilled in the art that all or some of acts, systems, and functional modules/units in the devices disclosed above may be implemented as software, firmware, hardware, or an appropriate combination thereof. In a hardware implementation, division between functional modules/units mentioned in the above description does not necessarily correspond to division of physical components; for example, a physical component may have multiple functions, or a function or an act may be cooperatively performed by several physical components. Some or all of the physical components may be implemented as software executed by a processor, such as a central processing unit, a digital signal processor, or a microprocessor, or as hardware, or as an integrated circuit, such as an application specific integrated circuit. Such software may be arranged on a computer-readable medium, which may include a computer storage medium (or a non-transitory medium) and a communication medium (or a transitory medium). As well known to those of ordinary skill in the art, the term computer storage medium includes volatile and nonvolatile, removable and non-removable media implemented in any method or technology for storing information (such as computer readable instructions, a data structure, a program module or other data). The computer storage medium includes but is not limited to RAM, ROM, EEPROM, a flash memory or another memory technology, CD-ROM, a digital versatile disk (DVD) or another optical disk storage, a magnetic box, a magnetic tape, a magnetic disk storage or another magnetic storage device, or any other medium that may be configured to store desired information and may be accessed by a computer. Furthermore, it is well known to those of ordinary skill in the art that the communication medium typically contains computer readable instructions, a data structure, a program module, or other data in a modulated data signal such as a carrier wave or another transmission mechanism, and may include any information delivery medium.

What is claimed is:

1. A free space optical communications method, comprising:
    transmitting, by a transmitter, wireless data to a receiver through an optical signal, wherein there exist wireless detection signals different from the optical signal between the transmitter and the receiver; and
    determining, by the transmitter, whether the wireless detection signals are blocked, and reducing an intensity of the optical signal or suspending transmission of the optical signal when the wireless detection signals are blocked,
    wherein the wireless detection signals are distributed around the optical signal.

2. The free space optical communications method of claim 1, wherein:
    determining, by the transmitter, whether the wireless detection signals are blocked, comprises:
    emitting, by the transmitter, the wireless detection signals through a radar, and when part or all of the wireless detection signals are blocked, measuring, by the transmitter, a distance between the transmitter and a blockage; if the distance between the transmitter and the blockage is consistent with a distance between the transmitter and the receiver, determining that the wireless detection signals are not blocked; if the distance between the transmitter and the blockage is not consistent with the distance between the transmitter and the receiver, determining that the wireless detection signals are blocked.

3. The free space optical communications method of claim 1, wherein:
determining, by the transmitter, whether the wireless detection signals are blocked, comprises:
emitting, by the transmitter, the wireless detection signals;
receiving, by the transmitter, feedback information sent by the receiver, wherein the feedback information is used for indicating that all of the wireless detection signals are received or the wireless detection signals are not blocked, or part or all of the wireless detection signals are not received; and
determining, by the transmitter, whether the wireless detection signals are blocked according to information fed back by the receiver.

4. The free space optical communications method of claim 1, wherein:
determining, by the transmitter, whether the wireless detection signals are blocked, comprises:
emitting, by the transmitter, the wireless detection signals; and
receiving, by the transmitter, feedback information continuously sent by the receiver, wherein the feedback information is used for indicating that all of the wireless detection signals are received or the wireless detection signals are not blocked; and determining, by the transmitter, that the wireless detection signals are not blocked when the feedback information is received, and determining that the wireless detection signals are blocked when the feedback information is not received.

5. The free space optical communications method of claim 1, wherein:
determining, by the transmitter, whether the wireless detection signals are blocked, comprises:
receiving, by the transmitter, wireless detection signals emitted by the receiver, if all of the wireless detection signals are received, determining that the wireless detection signals are not blocked, and if the wireless detection signals are not received or only part of the wireless detection signals are received, determining that the wireless detection signals are blocked.

6. The free space optical communications method of claim 1, wherein the wireless detection signals comprise any one or more of following signals:
an optical signal safe for human eyes;
a microwave signal;
a milli-light wave signal;
a laser signal safe for human eyes; or
an infrared signal.

7. A free space optical communications method, comprising:
receiving, by a receiver, wireless data transmitted by a transmitter to the receiver through an optical signal;
receiving, by the receiver, wireless detection signals different from the optical signal and emitted by the transmitter; and
feeding back information of whether the wireless detection signals are blocked to the transmitter,
wherein the wireless detection signals emitted by the transmitter are wireless detection signals safe for human eyes, and the wireless detection signals are distributed around the optical signal.

8. The free space optical communications method of claim 7, wherein:
receiving the wireless detection signals different from the optical signal and emitted by the transmitter, and feeding back the information of whether the wireless detection signals are blocked to the transmitter, comprises:
receiving, by the receiver, the wireless detection signals emitted by the transmitter, and feeding back the information to the transmitter, wherein if all of the wireless detection signals are received, feeding back, by the receiver, first indication information indicating that the wireless detection signals are not blocked; and if part or all of the wireless detection signals are not received, feeding back, by the receiver, second indication information indicating that the wireless detection signals are blocked.

9. The free space optical communications method of claim 7, wherein:
receiving the wireless detection signals different from the optical signal and emitted by the transmitter, and feeding back the information of whether the wireless detection signals are blocked to the transmitter, comprises:
receiving, by the receiver, the wireless detection signals emitted by the transmitter; and
continuously feeding back, by the receiver, information to the transmitter if all of the wireless detection signals are received, and suspending, by the receiver, feeding back information if part or all of the wireless detection signals are not received, wherein the information fed back is used for indicating that the wireless detection signals are not blocked.

10. The free space optical communications method of claim 7, wherein the wireless detection signals comprise any one or more of following signals:
an optical signal safe for human eyes;
a microwave signal;
a milli-light wave signal;
a laser signal safe for human eyes; or
an infrared signal.

11. A transmitter for free space optical communications, comprising: a processor and an optical signal transmitter, wherein:
the optical signal transmitter is configured to transmit wireless data to a receiver through an optical signal, wherein there exist wireless detection signals different from the optical signal between the transmitter and the receiver; and
the processor is configured to determine whether the wireless detection signals are blocked and to reduce an intensity of the optical signal or suspend transmission of the optical signal when the wireless detection signals are blocked, wherein the wireless detection signals are distributed around the optical signal.

12. The transmitter for free space optical communications of claim 11, wherein:
the processor is configured to emit, through a radar unit, the wireless detection signals, and measure a distance between the transmitter and a blockage when part or all of the wireless detection signals are blocked; and determine that the wireless detection signals are not blocked if the distance between the transmitter and the blockage is consistent with a distance between the transmitter and the receiver, and determine that the wireless detection signals are blocked if the distance between the transmitter and the blockage is not consistent with the distance between the transmitter and the receiver.

13. The transmitter for free space optical communications of claim 11, wherein:
the processor is configured to emit, through a detection signal emitting unit, the wireless detection signals; receive, through an information receiving unit, feedback information sent by the receiver, wherein the feedback information is used for indicating that all of the wireless detection signals are received or the wireless detection signals are not blocked, or part or all of the wireless detection signals are not received; and determine whether the wireless detection signals are blocked according to information fed back by the receiver.

14. The transmitter for free space optical communications of claim 11, wherein:
the processor is configured to emit, through a detection signal emitting unit, the wireless detection signals; receive, through an information receiving unit, feedback information continuously sent by the receiver, wherein the feedback information is used for indicating that all of the wireless detection signals are received or the wireless detection signals are not blocked; and determine that the wireless detection signals are not blocked when the feedback information is received, and determine that the wireless detection signals are blocked when the feedback information is not received.

15. The transmitter for free space optical communications of claim 11, wherein:
the processor is configured to receive, through an information receiving unit, wireless detection signals emitted by the receiver; and determine that the wireless detection signals are not blocked if all of the wireless detection signals are received, and determine that the wireless detection signals are blocked if the wireless detection signals are not received or only part of the wireless detection signals are received.

16. The transmitter for free space optical communications of claim 11, wherein the wireless detection signals comprise any one or more of following signals:
an optical signal safe for human eyes,
a microwave signal,
a milli-light wave signal,
a laser signal safe for human eyes, or
an infrared signal.

* * * * *